Feb. 8, 1944.  F. J. SIGMUND ET AL  2,340,905
PLASTIC SUPPORTED WINDING ELEMENT
Filed Aug. 4, 1942   2 Sheets-Sheet 2
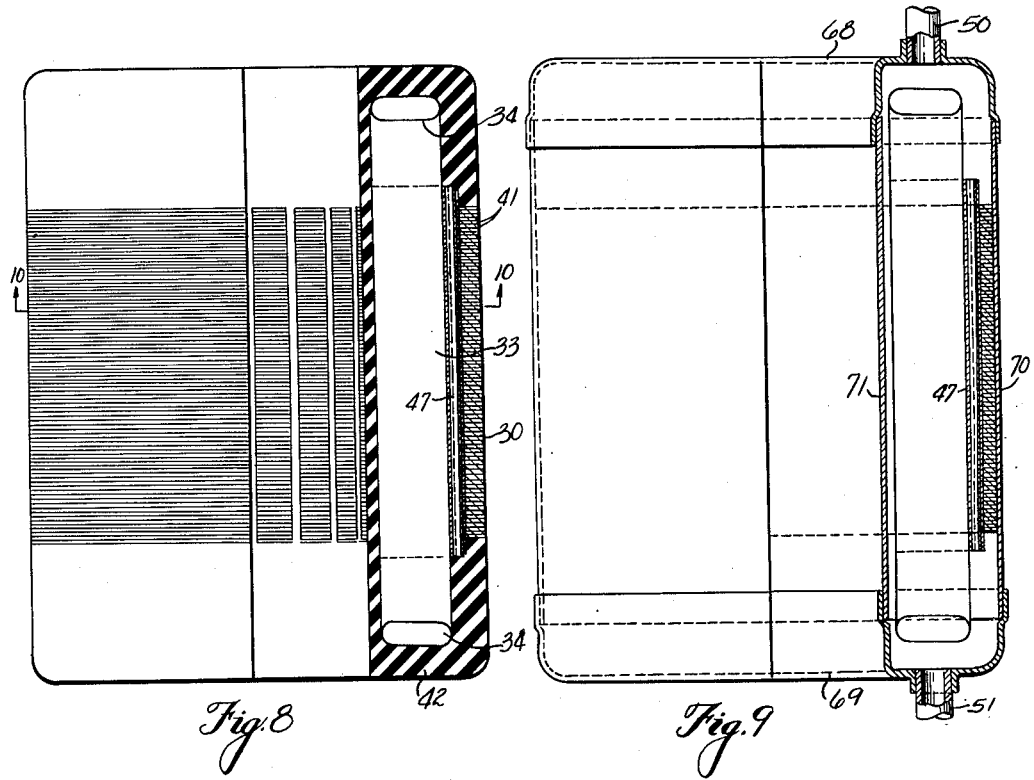
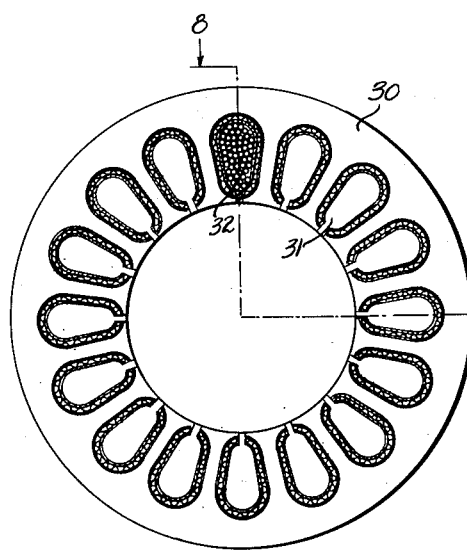
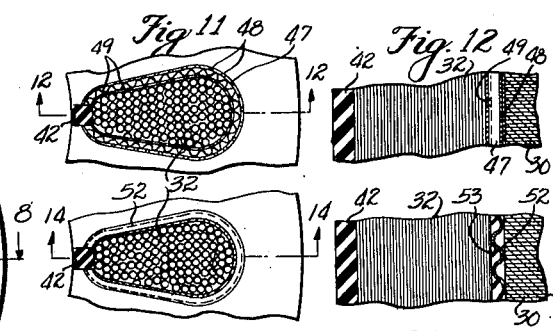
INVENTOR.
Frank J. Sigmund
BY William S. Hlavin
Hoodling and Krost attys Patented Feb. 8, 1944

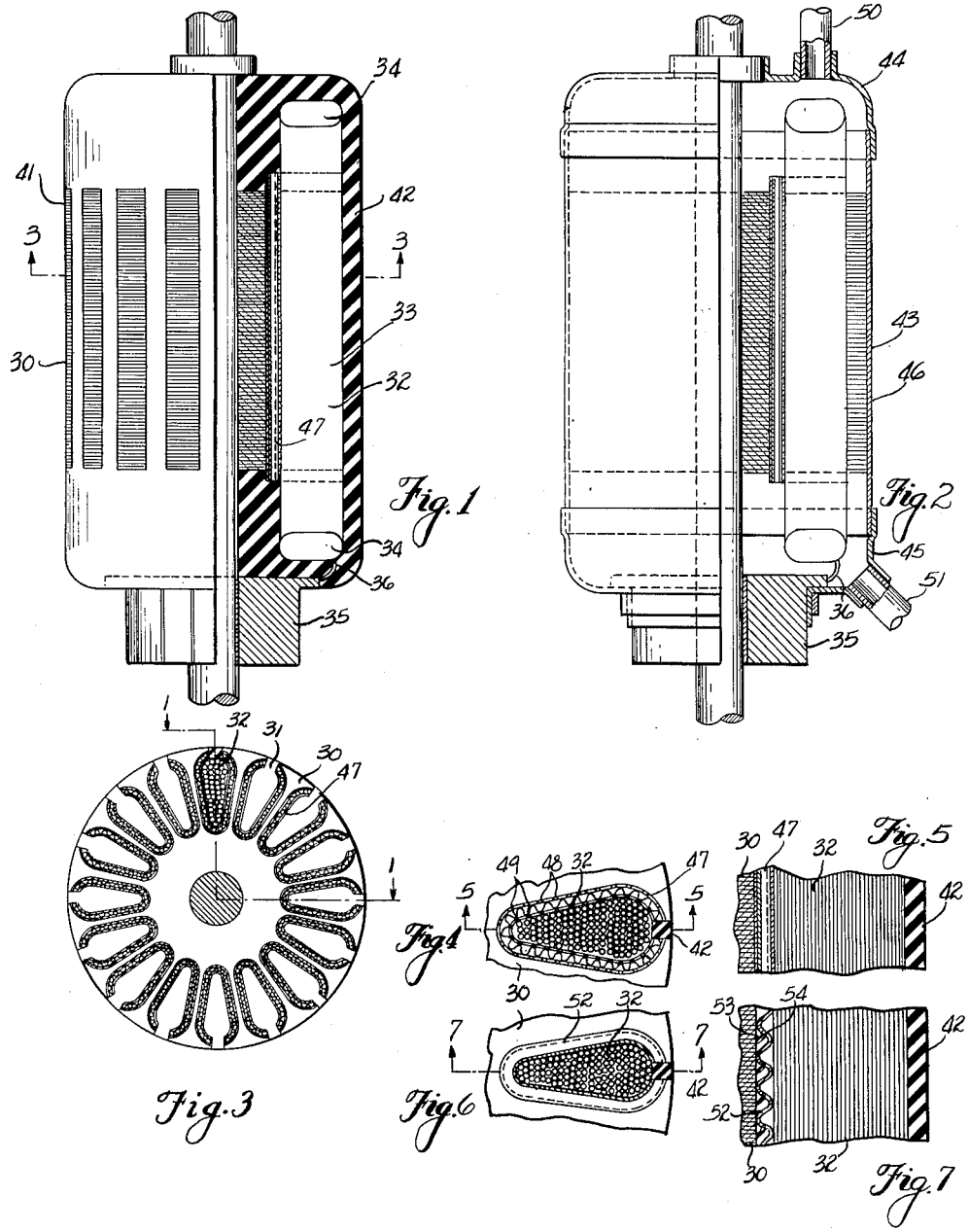

2,340,905

UNITED STATES PATENT OFFICE 2,340,905

PLASTIC SUPPORTED WINDING ELEMENT

Frank J. Sigmund and William S. Hlavin, Cleveland, Ohio, assignors to The Lake Erie Chemical Company, a corporation of Ohio Application August 4, 1942, Serial No. 453,562

8 Claims. (Cl. 171—206)

Our invention relates in general to winding elements for dynamo-electric machines and more particularly to plastic supported winding elements which may be operated at high speed and voltages and which will withstand a great deal of moisture and vibration without damage.

The term "plastic supported" refers to the fact that the winding elements are supported in the slots of the magnetizable core by the use of a plastic or any other suitable material which may be castable or injected about the winding elements to render the winding elements in a solid support within the slots of the core, wherein the winding elements are water or moistureproof, dust-proof, insulation-proof and vibration-proof.

An object of our invention is the provision of supporting the winding elements in the slots of a magnetizable core by employing a castable or ejectable material about the windings in the slots.

Another object of our invention is the provision of employing a destroyable mold for casting the castable material about the windings in the slots of the core to mechanically support the windings in one core.

Another object of our invention is the provision of insuring that the castable material completely surrounds the windings within the slots to make a good mechanical support for the windings.

Another object of our invention is the provision of pre-coating or pre-dipping the magnetizable core and the windings with a thin coating which reacts favorably with the castable material which is cast about the windings in the slots of the magnetizable core.

Another object of our invention is the provision of coating each of the laminations prior to their being stacked into the core with a thin layer of material which renders the stacked laminations completely water-tight.

In this application and throughout the claims, for the sake of brevity, the term "winding elements" will be used to designate both the stationary and the rotatable elements of the dynamo-electric machine. Also, the term "castable" includes plastic material which has been either poured or injected into the mold; that is, the term "castable" includes ejected material as well as cast material, or any other material which under one condition is viscous and under another condition is hard and provides a good mechanical support for the windings.

Other objects and a fuller understanding of our invention may be had be referring to the accompanying description and claims, taken in conjunction with the drawings, in which:

Figure 1 is a side elevational view of a rotor or armature of a dynamo-electric machine embodying the features of our invention with one side thereof shown in section, taken along the line 1—1 of Figure 3;

Figure 2 is a view similar to Figure 1 but shows the castable mold about the rotor or armature preparatory to casting the castable material about the windings of the core;

Figure 3 is a cross-sectional view taken along the line 3—3 of Figure 1, wherein one of the slots is shown filled with wires, the other slot being shown unfilled for the purpose of simplicity;

Figure 4 is an enlarged cross-sectional view of a slot showing the features of our invention;

Figure 5 is a cross-sectional view of Figure 4 taken along the line 5—5 thereof;

Figure 6 is a view similar to Figure 4 but shows a further modified form the sleeve or liner which envelopes the windings;

Figure 7 is a cross-sectional view of Figure 6 taken along the line 7—7 thereof;

Figure 8 illustrates a vertical side elevational view of a stator employing the features of our invention with one side thereof shown in section and cut along the line 8—8 of Figure 10;

Figure 9 is a view similiar to Figure 8 but shows destroyable molds about the stator prior to being cast with the castable material;

Figure 10 is a cross-sectional view taken along the line 10—10 of Figure 8 which shows one of the slots being completely filled with the windings, the other slots being shown unfilled with the windings for simplicity;

Figure 11 is an enlarged cross-sectional view of the windings in the slots of the stator;

Figure 12 is a cross-sectional view taken along the line 12—12 of Figure 11;

Figure 13 a view similar to Figure 11 but shows a further modified arrangement of the sleeve for enveloping the windings;

Figure 14 is a cross-sectional view taken along the line 14—14 of Figure 13.

With reference to Figure 1 which shows the completed rotor or armature embodying the features of our invention, the reference character 30 represents the laminated core having windings 32 provided in the slots 31 arranged peripherally around the core. The windings comprise coil sides 33 which are mounted in the slots and coil heads 34 which pass around the ends of the core. As diagrammatically illustrated, the lower end of the coil heads 34 are connected to the commutator bars 35 by means of the connection 36. Prior to inserting the windings in the slots of the core, we position a perforated corrugated sleeve 47 in each of the slots for enveloping the windings. The outer surface is provided with openings 48 and the inner surface with openings 49 so that as the liquid castable resin is fed into the molds, it may flow completely around the windings up through the spaces provided by the corrugations and out through the openings 48 and 49 within the slots and about the windings enveloped by the sleeve. The Figure 5 is a cross-sectional view of Figure 4 and shows the vertically arranged passages provided by the corrugated sleeve 47.

Prior to the casting of the castable material about the windings and the core, the entire core with the windings provided in the slots is dipped into a bath of heated polystyrene which is maintained at a temperature in the neighborhood of 195° or 200° Fahrenheit. The bath of polystyrene is a very thin liquid and penetrates all of the interstices of the laminated core and completely forms a film or thin covering around each of the wires within the slots. Also, in constructing the laminated core we preferably take each of the laminations and apply a thin coating of polystyrene to the outer surface thereof, after which the laminations are assembled and stacked together under a heated temperature so that the stacked laminations are completely water-tight and impervious to any seepage of water or moisture between the laminations. The polystyrene film between the laminations may be indicated by the reference character 41 in Figure 1 and may be applied in a thin film to the outer surface of the laminations either by dipping the laminations into a heated bath of polystyrene or by spraying the polystyrene thereon under a heated temperature.

The castable material in all the views of the drawings is indicated by the reference character 42 and may comprise castable resins which are thermo-setting and which upon setting are capable of being worked, or machined by any suitable cutting tool. The resin may be incorporated with asbestos or other inorganic fillers to improve their mechanical, electrical and thermal properties. In actual practice we find "Catalin" very satisfactory. Other types of phenol-aldehydes may be used instead of "Catalin." The "Catalin" and the plystyrene film act favorably toward each other so that there is a good bond between the "Catalin" and the polystyrene which is completely surrounding the inside surface of the slots and the windings. We further find that the polystyrene when applied to the outer surface of the windings, which may have an enamel coating, does not destroy the enamel coating upon the wires. In casting the castable resin about the windings in the slots and the coil heads, we mount the complete core with the windings therein in a mold indicated generally by the reference character 43 which comprises a top portion 44, a bottom portion 45, and a central cylindrical portion 46. The mold is arranged to be made out of destroyable material so that after the castable resin has set the mold may be removed from the completed core by stripping or breaking it therefrom. The mold may be made of very thin material such, for axample, as tin, lead or glass, or paper or any other treated material which may be destroyed upon removing same from the core.

The connection between the top and bottom portions of the mold with the cylindrical portion 46 may be sealed so that the liquid castable resin will not flow therethrough. The liquid castable resin may be inserted into the mold by heating the castable resin under pressure through the tube 51 until the castable resin completely fills the inside of the mold. A vacuum may be applied to the tube 50 to remove all possible traces of air or other gases. The vacuum may remain only for a short period of time sufficient to remove the gases and air, after which the vacuum may be removed. The bottom of the mold may be clamped tightly about the commutator 35 and the top of the mold may be clamped tightly about a collar or shoulder upon the shaft of the core. As the castable resin flows upwardly within the mold, it flows through the openings in the corrugated sleeves and out through the openings 49 of the sleeve into the space about the wires to completely surround same. The liquid resin or "Catalin" may be set by heating the same at about 80° C. for a predetermined period. When finally set the liquid resin becomes hard and provides a good mechanical support for the windings in the slots. Any suitable means may be provided for heating the liquid resin or "Catalin" in the mold. In order to reduce the amount of time required to set the liquid resin or "Catalin," the core may be pre-heated to approximately the correct temperature before the liquid resin is fed into the mold. In the completed rotor or armature the coil heads upon each end of the rotating element as well as the coils within the slots are mechanically supported by the castable resin to make a good strong mechanical support for the windings which render them moisture-proof, dust-proof, insulation-proof and vibration-proof.

In Figures 6 and 7 we show a modified arrangement of another corrugated sleeve illustrated by the reference character 52. In this form of the corrugated sleeve, there are no outer and inner walls as shown with reference to Figure 4 but the corrugated surfaces are provided with openings 54 which are made by stamping out tabs 53 in the corrugated surfaces of the sleeve, see Figure 7. By this construction, the liquid castable resin may flow to the windings up through the openings 54 and then out around and about the windings in the slots.

The Figures 8 to 14, inclusive, relate to the application of our invention to the stator of a dynamo-electric machine and the Figures 8 to 14 represent, respectively, the Figures 1 to 7 so far as corresponding views are concerned. In addition, corresponding parts of the armature or rotor on one hand and the stator on the other hand are designated by the same reference character. That is to say, the core for the stator is represented by the reference character 30 and the slot by the reference character 31 and the windings by the reference character 32 having coil sides 33 and coil heads 34. Furthermore, the same reference characters apply to corresponding parts regarding the sleeves, the grooves, and the partition for providing ready access of the flow of the liquid and castable resin to the windings within the slots. Accordingly, the description with reference to the rotor or armature on one hand apply equally well to the description of the Figures 8 to 14 which are directed to the construction of a stator. The mold for the stator is somewhat different from the mold from the armature or rotor and thus we have applied new reference characters to the mold in that the top of the mold is indicated by the reference character 68, the bottom by the reference character 69 and the outer central mold by the reference character 70, and the inner central mold by the reference character 71. The mold for the stator may be of the same material as that described with reference to the armature rotor and may be destroyable when the castable resin has been set. The inner central mold 71 fits closely within the central opening of the stator and the outer central mold fits closely around the peripheral dimension of the stator core. The liquid and castable resin is fed through the feed tube 51 whereupon the liquid and castable resin flows upwardly through the mold which fills all of the grooves, channels and other spaces about the windings to give a good mechanicald support to the windings when the castable resin is once hardened. A vacuum may be applied to the vacuum tube 51 during the early stages of the supplying of the liquid and castable resin so that all of the air or other gases may be extracted therefrom.

After the vacuum has been removed, the liquid castable resin may be maintained under a positive pressure to insure complete impregnation of all the spaces in and about the windings.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves extending throughout the length of the slots and keeping the windings from contacting the sides of the slots, and a mass of castable resin in the slots and filling the spaces about the windings in said slots to mechanically support the windings, said sleeve having a wall structure including a corrugated sheet of material to provide communication for said castable resin throughout the length of said slots and about said windings.

2. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves extending throughout the length of the slots and keeping the windings from contacting the sides of the slots, and a mass of castable resin in the slots and filling the spaces about the windings in said slots to mechanically support the windings, said sleeve having a wall structure including a perforated corrugated sheet of material to provide communication for said castable resin throughout the length of said slots and about said windings.

3. In the construction of a winding element having a magnetizable core with a plurality of winding slots and windings in said slots the improvement of mechanical support means to support the windings in the slots, said mechanical support means comprising, in combination, a sleeve for each of the slots to envelope the winding, said sleeves extending throughout the length of the slots and keeping the windings from contacting the sides of the slots, and a mass of castable resin in the slots and filling the spaces about the windings in said slots to mechanically support the windings, said sleeve having a wall structure including a perforated sheet of material to provide communication for said castable resin about said windings.

4. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves engaging the side wall of the slots and keeping the windings from contacting the side walls of the slots, and a mass of insulating material in the slots and filling the spaces about the windings in said slots to mechanically support the windings, said sleeve having a wall structure a corrugated sheet of material to provide communication for said insulating material about said windings.

5. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves engaging the side wall of the slots and keeping the windings from contacting the side walls of the slots, and a mass of insulating material in the slots and filling the spaces about the windings in said slots to mechanically support the windings, said sleeve having a wall structure including a perforated corrugated sheet of material to provide communication for said insulating material about said windings.

6. In the construction of a winding element having a magnetizable core with a plurality of winding slots and windings in said slots, the improvement of supporting the windings in the slots, said improvement comprising, in combination, a sleeve for each of the slots to envelope the windings, said sleeves engaging the side wall of the slots and each having a longitudinal opening through which the winding is inserted, and a mass of insulating material filling the said opening, each of said sleeves having a wall structure including a corrugated sheet of material.

7. In the construction of a winding element having a magnetizable core with a plurality of winding slots and windings in said slots, the improvement of supporting the windings in the slots, said improvement comprising, in combination, a sleeve for each of the slots to envelope the windings, said sleeves engaging the side wall of the slots and each having a longitudinal opening through which the winding is inserted, and a mass of insulating material filling the said opening, each of said sleeves having a wall structure including a corrugated sheet of material, said mass of insulating material terminating in an annular ring upon each end of the core, said sleeves extending beyond the ends of the core and being embedded in the annular rings of insulating material.

8. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves engaging the side wall of the slots and keeping the windings from contacting the side walls of the slots, and a mass of insulating material in the slots and filling the spaces about the windings in said slots to mechanically support the windings, said sleeve having a wall structure with spaced oppositely extending portions, certain of which portions engage the side wall of the slots and certain of which portions engage the windings in the slots, whereby the windings are spaced from the side wall of the slots to provide communication for said insulating material about said windings.

FRANK J. SIGMUND.
WILLIAM S. HLAVIN.